J. M. STOREY.
DEVICE FOR CONVERTING MOTION.
APPLICATION FILED AUG. 28, 1912.
1,087,615.
Patented Feb. 17, 1914.
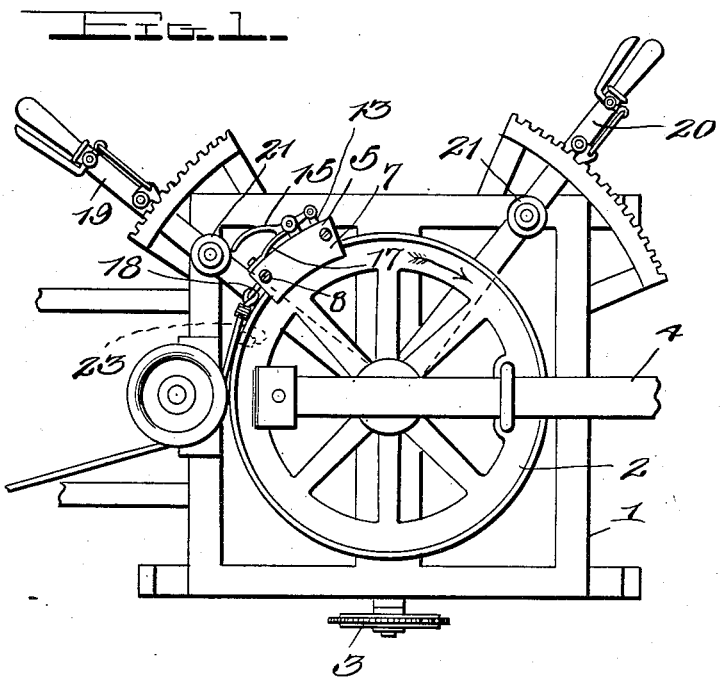
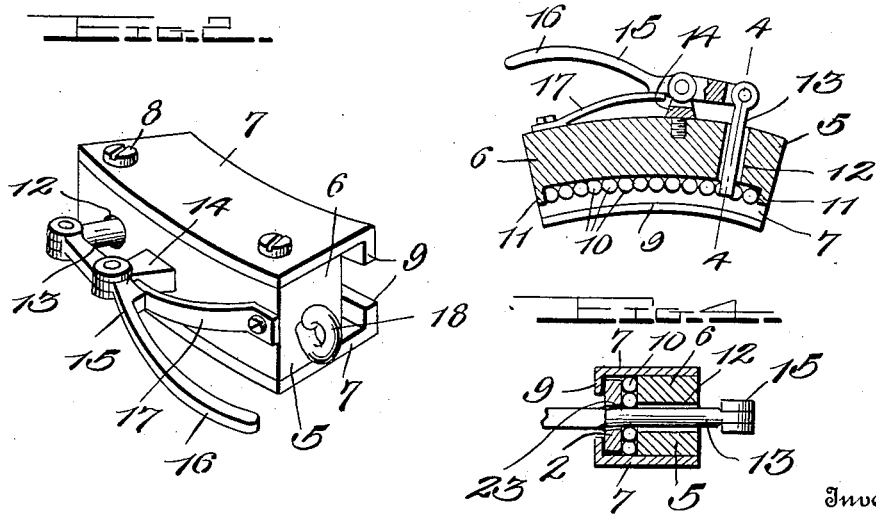
Witnesses
Chas. L. Griesbauer.
A. B. Norton.
Inventor
J. M. Storey,
By Watson E. Coleman,
Attorney

UNITED STATES PATENT OFFICE.

JAMES M. STOREY, OF HOSCHTON, GEORGIA.

DEVICE FOR CONVERTING MOTION.

1,087,615.  Specification of Letters Patent.  Patented Feb. 17, 1914.

Application filed August 28, 1912. Serial No. 717,649.

*To all whom it may concern:*

Be it known that I, JAMES M. STOREY, a citizen of the United States, residing at Hoschton, in the county of Jackson and State of Georgia, have invented certain new and useful Improvements in Devices for Converting Motion, of which the following is a specification, reference being had to the accompanying drawings.

This invention comprehends new and useful improvements in devices for converting motion and relates more particularly to that class of clutches used in conjunction with hay presses, as illustrated in my copending application, filed May 11, 1912, Serial Number 696,683.

The invention has for a primary object a simple, durable and efficient construction of apparatus of this character, the parts of which may be cheaply manufactured and readily assembled and installed, and which will require practically no attention to maintain in proper running order. And the invention also aims to generally improve this class of devices and to render them more useful and commercially desirable.

With these and other ends in view, the invention consists in the improved construction and novel arrangement of parts, which will be hereinafter fully described, and particularly pointed out in the claims.

In the accompanying drawings has been illustrated a simple and preferred form of the invention, it being, however, understood that no limitation is necessarily made to the structural details therein exhibited, but that the right is reserved to any changes, alterations, and modifications to which recourse may be had within the scope of the invention and without departing from the spirit or sacrificing the efficiency of the same.

In the said drawings, Figure 1 illustrates the plan view of a portion of a hay press having my invention as applied thereto. Fig. 2 is a perspective view of the slidable carriage. Fig. 3 is a horizontal longitudinal section through the same, and Fig. 4 is a transverse section taken on the line 4—4 of Fig. 3.

Reference now being had to the accompanying drawings wherein corresponding parts are designated by like numerals throughout the several views, the numeral 1 indicates a portion of a hay press frame having journaled therein a vertically extending shaft upon the upper end of which is keyed a pulley 2. This vertically extending shaft is in operative connection with a transversely extending shaft having keyed thereto a sprocket wheel 3 to which is connected a suitable source of power. Many hay presses which are now in use rely upon draft animals for the power of operating the same, so as to provide means whereby the draft animals may be used, I permanently mount upon the pulley 2 a shaft, indicated by the numeral 4.

Slidably mounted upon the rim of the pulley 2 is a carriage, indicated generally by the numeral 5. This carriage comprises a central block 6 having secured to its opposite faces side plates 7 by means of stud bolts or the like 8. The inner edges of the side plates 7 project beyond the block 6 and then are bent at right angles thereto to form lips 9 which are adapted to travel upon the inner face of the rim of the pulley. The inner face of the block 6 is of a configuration substantially as that of the outer periphery of the rim of the pulley, and has mounted therein bearing balls 10 which rest upon the rim of the pulley and are retained within the lower face of the block 6 by means of lips 11. The block 6 has formed therein adjacent one end a transversely extending opening 12 in which reciprocally operates a pin 13. A bearing block 14 is detachably mounted upon the outer face of the block 6 and has fulcrumed therein a lever 15. The shorter arm of this lever is pivotally connected to the outer end of the pin 13 and the opposite end of the longer arm, indicated by the numeral 16, is curved inwardly at its free end for a purpose which will be hereinafter more fully described. A leaf spring 17 is permanently secured at one end to the outer face of the block 6, whereas its opposite or free end rests upon the longer arm of the lever 15, which obviously provides means for holding the pin 13 within the opening 12. An eye bolt 18 is secured to the carriage and has attached thereto a flexible member which is connected to the reciprocating plunger of the hay press or any other movable element of the machine upon which this device is operatively mounted.

Pivotally mounted upon the vertically extending shaft which is journaled within the frame 1 are a pair of levers 19 and 20, respectively, each of which has journaled thereon a roller 21. Each of these levers 19 and 20, respectively, is provided with a spring actuated pawl for engagement with a segmental rack fixed upon the frame 1 whereby the lever may be held in the desired adjusted position.

The rim of the pulley 2 is provided with an aperture in which is adapted to rest the pin 13 when the carriage is being carried by the said pulley. It is obvious from this construction that as the pulley 2 is rotated in the direction of the arrow, as shown, the opening formed therein will come in register with the pin 13 and the leaf spring 17 will hold the pin 13 within the opening, thereby the pulley will carry the carriage with it thereby operating the plunger of the hay press or other means to which the carriage is connected, until the longer arm 16 of the lever mounted upon the carriage comes into engagement with the roller 21, journaled upon the lever 20, which will obviously lower the longer arm of the lever and draw the pin 13 out of engagement with the opening formed within the pulley, thereby permitting the carriage to return to its former position. When the carriage has returned to its original position the curved end of the longer arm 16 of the lever will engage under the roller 21 journaled upon the lever 19 and thereby still holding the pin out of contact with the pulley, but should it be desired to again permit the carriage to be carried by the pulley, the roller 21 is thrown out of engagement with the lever 16 by operating the lever 19, thereby releasing the lever 15 which permits the pin 13 to rest upon the pulley, and when the said pin comes into engagement with the opening formed within the pulley, the carriage will be carried with the pulley in the direction of the arrow, as shown. It is obvious from the foregoing that upon continuation of this operation, the carriage will be permitted to slide upon the pulley, thereby imparting a reciprocatory motion to any member with which the flexible member is connected and which may be operated at predetermined intervals.

Having thus described my invention, what I claim is:

1. In a device of the character described, a rotary member, a carriage loosely mounted upon said rotary member and adapted to be moved thereby between two predetermined points, means arranged upon said carriage to lock the same on the rotary member, means for automatically operating said locking means at one terminal of the movement of the carriage to permit of the reverse movement of the carriage with respect to the rotary member, and additional means arranged at the other terminal of movement of the carriage to operate the locking means and hold the locking element thereof out of engagement with the rotary member.

2. In a device of the character described, a rotary member, a carriage loosely mounted upon said rotary member for movement between two predetermined points, means arranged upon said carriage to lock the same upon said member for rotation therewith, and means for automatically actuating the locking device at each end of the movement of the carriage to disengage the locking element from the rotary member.

3. In a device of the character described, a rotary member, a carriage loosely mounted upon said rotary member for movement between two predetermined points, means arranged upon said carriage to lock the same upon said member for rotation therewith, and adjustable means for predetermining the extent of movement of said carriage with the rotary member, said means actuating the locking device at the end of the movement of the carriage with said member to release the carriage and permit its reverse movement.

4. In a device of the character described, a rotary member, a carriage slidably mounted upon the periphery thereof, said carriage comprising a central block, side plates secured to said block and adapted to engage the inner face of said rotary member, a pin carried by said block, a lever mounted upon said block and connected to said pin, and means for operating said lever, substantially as and for the purpose specified.

5. In a device of the character described, a rotary member, a carriage slidably mounted upon the rim of said rotary member, the said carriage comprising a central member, a pair of plates detachably secured to the opposite sides of said central member, the outer ends of said plates adapted to engage the inner face of the rim of the rotary member, a block carried by the outer face of the central member, a lever pivotally mounted upon said block, a pin extending from said block and connected at one end to said lever, means for operating said lever whereby said pin will be operated, substantially as and for the purpose described.

6. In a device of the character described, a driven member constantly rotating in one direction, a carriage mounted for circumferential movement upon the periphery of said member, locking means arranged upon the carriage to engage said member and lock the carriage thereon, spaced adjustable rollers arranged contiguous to the rotary member to engage the locking means and release the carriage for movement with respect to said member, one of said rollers normally holding the locking element in its ineffective position to permit of the movement of the rotary member with respect to the carriage.

7. In a device of the character described, a constantly driven rotary member, a carriage movable upon the periphery of said member, means for locking said carriage upon the member for movement therewith, a pair of relatively adjustable levers, and a roller mounted upon each of said levers to engage the locking means of the carriage and release the carriage from the rotary member, the adjustment of said levers determining the extent of movement of the carriage with said rotary member and one of said rollers normally coöperating with the locking means to permit of the movement of the rotary member with respect to the carriage.

8. In a device of the character described, a rotary member, a carriage movable upon the periphery of said member, means for locking the carriage on the rotary member for movement therewith, spaced relatively stationary elements arranged adjacent to the periphery of said rotary member to actuate the locking means and release the carriage, and means for adjusting said elements circumferentially of the rotary member to vary the extent of movement of the carriage with said member.

9. In a device of the character described, a rotary member, a carriage movable upon the periphery of said member, locking means mounted upon the carriage including a pin and a spring pressed lever normally holding said pin in engagement with the rotary member, and spaced rollers adjustable circumferentially of the rotary member to engage said lever and move the pin out of locking engagement with the rotary member.

10. In a device of the character described, a rotary member, a carriage movable upon the periphery of said member, locking means mounted upon said carriage including a movable locking member for engagement with the rotary member and a spring pressed lever to actuate said element, a roller arranged contiguous to the periphery of said rotary member to engage said lever and move the locking element out of engagement with the rotary member, whereby the carriage is released and its reverse movement upon the rotary member permitted, and means for adjusting said roller whereby the extent of movement of said carriage with the rotary member may be varied.

In testimony whereof I hereunto affix my signature in the presence of two witnesses.

JAMES M. STOREY.

Witnesses:
J. M. D. TAYLOR,
R. L. HILL.

---

Copies of this patent may be obtained for five cents each, by addressing the " Commissioner of Patents, Washington, D. C."